No. 768,580. Patented August 30, 1904.

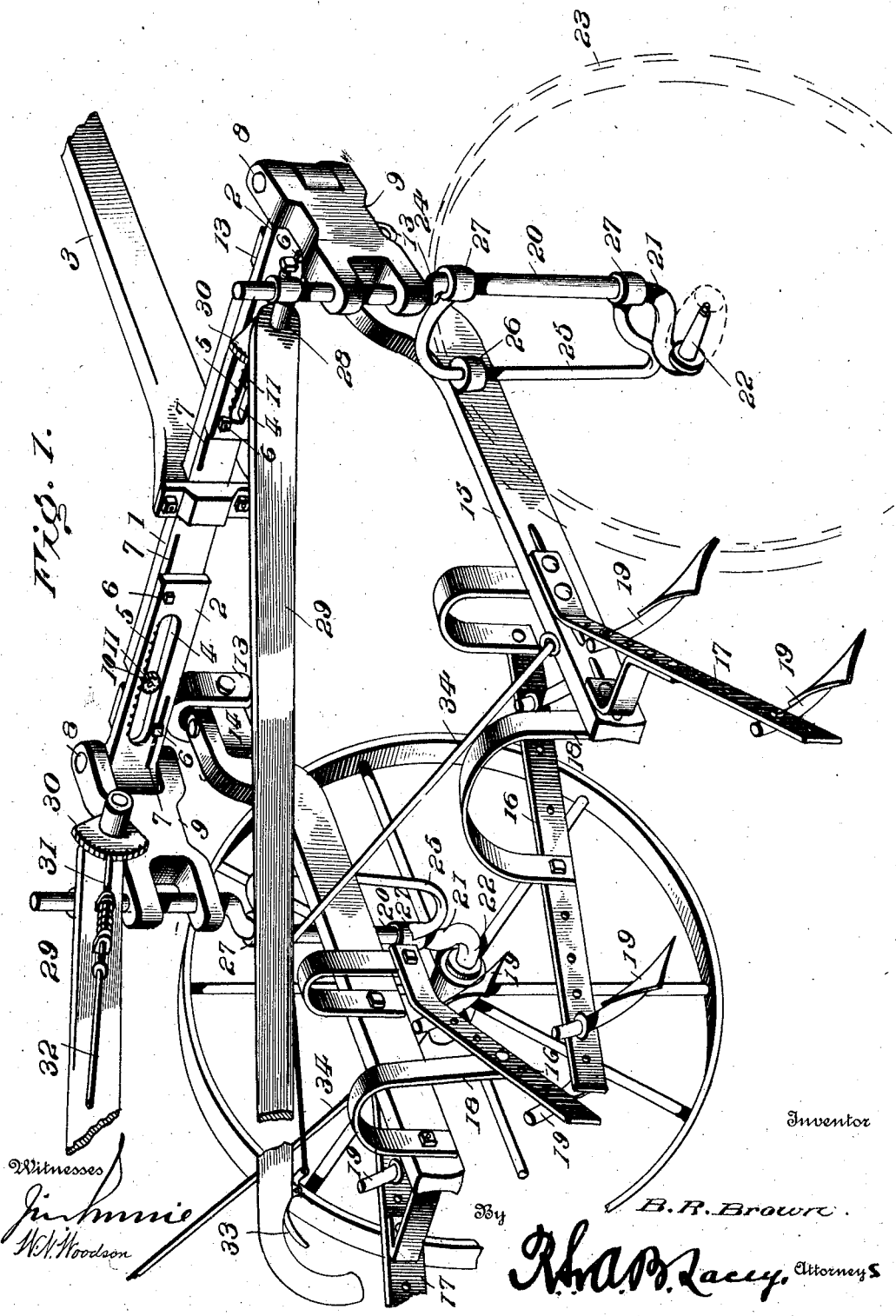

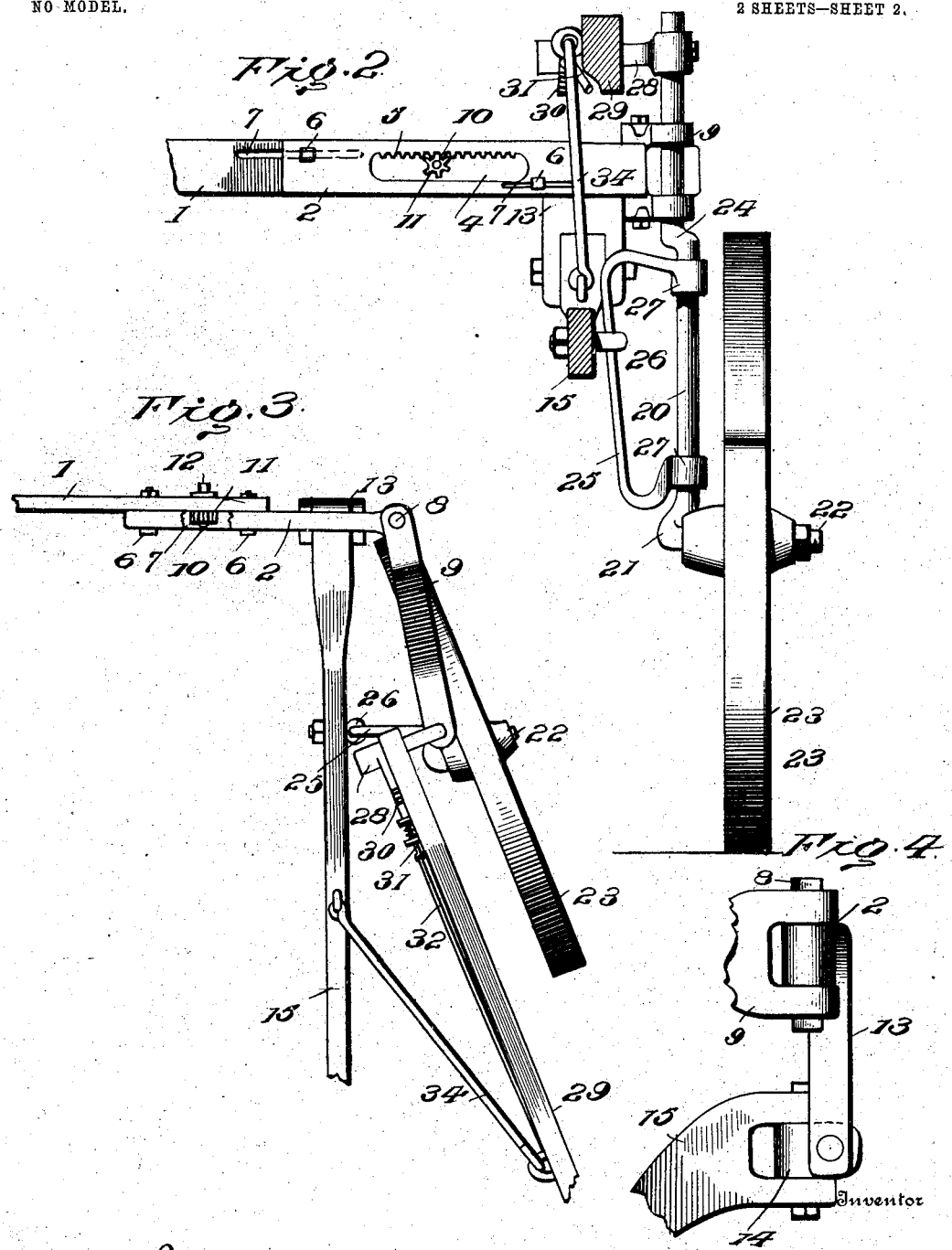

UNITED STATES PATENT OFFICE.

BARNEY R. BROWN, OF BARNEY, ARKANSAS.

CULTIVATOR.

SPECIFICATION forming part of Letters Patent No. 768,580, dated August 30, 1904.

Application filed May 13, 1904. Serial No. 207,838. (No model.)

*To all whom it may concern:*

Be it known that I, BARNEY R. BROWN, a citizen of the United States, residing at Barney, in the county of Faulkner and State of Arkansas, have invented certain new and useful Improvements in Cultivators, of which the following is a specification.

This invention is peculiarly adapted for agricultural implements of the cultivator type, and relates to the coupling means, which are so constructed and arranged as to admit of the beams having a variety of movements and adjustments essential for adapting the machine to the rows of plants when in service, so that injury to the plants may be wholly obviated by proper guidance of the cultivating devices.

The invention relates primarily to the general structure, also to the mountings of the handles and the connections between said handles and beams, whereby simultaneous movement is effected.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a cultivator embodying the invention. Fig. 2 is a transverse section of a side portion of the cultivator looking toward the front. Fig. 3 is a top plan view of the part of the cultivator shown in Fig. 2. Fig. 4 is a detail view of the front portion of a beam, the transverse bar, and the front end of the handle and wheel-support.

Corresponding and like parts are referred to in the following description and indicated in all the views of the drawings by the same reference characters.

The implement comprises a transverse bar to which the working parts are attached, and this bar is adjustable to admit of varying the width of the cultivator to meet existing conditions. The adjustable bar consists of the sections or members 1 and 2, the tongue 3 being clipped to the section 1. The end sections 2 are adjustable upon the middle section 1 and each is provided with a longitudinal slot 4, toothed upon one side, as shown at 5, and are held in place and directed in their movements by suitable means, such as pins 6 and slots 7. The slots 7 may be formed in either section, and the pins or fastenings 6 are fitted to the other section. The elements 6 preferably consist of bolts, thereby admitting of securing the sections 2 when adjusted to the required position. The outer ends of the sections 2 are vertically apertured or terminate in sleeves which receive vertical pins 8, by means of which the supports 9 are pivotally connected to the adjustable sections of the transverse bar, so as to swing horizontally. A shaft 10 is journaled to the end portion of each section 1 and is provided with a pinion 11, in mesh with the teeth 5. The projecting end 12 of the shaft 10 is made angular for reception of a wrench or other tool for turning the shaft 10 when it is required to move the section 2 either in or out. Before the sections 2 can be adjusted it is necessary that the fastenings 6 be loosened, after which rotation of the shaft 10 in one direction or the other moves the section 2 either in or out. When adjusted to the required position, the section 2 is secured by retightening the fastenings or bolts 6.

A hanger 13 is pendent from each end of the transverse bar and is forked at its lower end to receive a coupling 14, to which the beam 15 is pivoted so as to swing horizontally. The coupling 14 pivots upon its connection with the hanger 13 to admit of the beam 15 swinging up and down. Hence by means of the coupling the beam 15 has both a vertical and a horizontal movement. The cultivating devices are applied to the beam 15 near its rear end. These consist of bars 16 and 17, arranged upon opposite sides of the beam 15 and inclined thereto laterally and rearwardly. Arches 18 connect the bars 16 with the respective beams 15 and straddle the row or rows of plants being cultivated. The bars 17, arranged upon the outer sides of the beams 15, are rigidly connected thereto, and the shovels 19 attached thereto are adjustable to admit of varying the relative distance between said shovels as may be found most advantageous, according to the nature of the soil and plants.

A standard 20 is journaled in the rear end of each support 9, and its lower end is crooked, as shown at 21, and provided with a spindle-arm 22, upon which a ground-wheel 23 is mounted. An offset 24 is formed in the standard 20 immediately below the support 9 to limit the upward movement of the standard as well as to provide an adjustment for the ground-wheel when moved to give proper direction to the implement. A loose connection is provided between the lower portion of the standard 20 and the proximal beam 15, the same comprising a frame 25 and eye 26, the latter being attached directly to the beam 15 and the frame 25, coupled to the standard 20, by means of upper and lower offstanding arms which terminate in eyes or sleeves 27, through which the standard 20 loosely passes. Vertical displacement between the standard 20 and frame 25 is prevented by the sleeve of the upper arm engaging with the offset 24 and the sleeve of the lower arm engaging with the crook 21. An arm 28 is connected to the upper portion of each standard 20 above the support 9 and projects laterally therefrom and receives the inner end of the handle-bar 29, which is mounted thereon in such a manner as to admit of the rear end of the handle-bar being raised or lowered. A toothed segment 30 is rigidly connected to the inner end of each arm 28, and a latch 31, fitted to the handle-bar 29, coöperates therewith to secure said handle-bar in the required position. A connection 32 couples the latch 31 to a latch-lever 33, pivoted to the outer portion of the handle-bar, so as be within convenient reach of the grip for operation at will. A link 34 connects the rear portion of each beam 15 with the rear portion of the respective handle-bars 29 to admit of throwing the cultivator out of action at a moment's notice by elevating the rear end of the handle-bar. The cultivator may be held out of action by permitting the latch 31 to spring into engagement with a notch or tooth of the segment 30, as will be readily comprehended.

From the foregoing it will be understood that the beams 15 may be swung laterally or vertically by means of the handle-bars, and when swinging the beams 15 laterally the ground-wheels coupled thereto similarly move in a corresponding direction. The machine may be likewise steered by means of the handle-bars, since a horizontal movement of the latter at their rear ends effects a turning of the standards 20 and a corresponding movement of the ground-wheels. The loose connection between the beams 15 and the frames 25 admits of the rear ends of said beams being moved vertically without in the least affecting the standard 20 and the parts connected thereto.

Having thus described the invention, what is claimed as new is—

1. In an implement of the character described, the combination of a transverse support composed of sections relatively adjustable to admit of lengthening or shortening the support, a rack and pinion for adjusting the sections, means for securing the sections in an adjusted position, beams coupled to the adjustable sections and movable therewith, and handle-bars attached directly to said adjustable sections and connected to the respective beams for controlling their position.

2. In an implement of the character described, the combination of a transverse support composed of a middle and end sections, means for securing said sections in an adjusted position, beams coupled to the end sections and provided with cultivating devices and adapted to swing both vertically and laterally, handle-bars connected to said outer sections and adapted to move vertically and horizontally, connecting means between the handle-bars and beams, and means for securing the handle-bars in vertical position to hold the cultivating devices at any required elevation.

3. In an implement of the character described, the combination of a standard provided with a ground-wheel and beam provided with cultivating devices and mounted to swing vertically and horizontally, a loose connection between said beam and standard to cause both to swing horizontally, but admitting of independent vertical movement of the beam, a handle-bar supported by means of the standard and connected to swing horizontally therewith, but free to move vertically, means between the handle-bar and standard for holding the handle-bar in an adjusted position, and a connection between said handle-bar and beam.

4. In combination, a support mounted to swing horizontally, a standard journaled vertically in said support, and provided with a ground-wheel, an arm projected laterally from the standard, a handle-bar pivotally mounted on said arm, connecting means between the handle-bar and arm for securing the handle-bar in an adjusted position, a beam provided with cultivating devices mounted to swing both vertically and horizontally, a loose connection between said beam and standard, and a connection between the handle-bar and beam.

5. In combination, a frame comprising a laterally-adjustable section, a support pivoted to said section to swing horizontally, a standard journaled vertically in said pivoted support and provided at its lower end with a ground-wheel, an arm projected from the standard, a handle-bar pivoted upon said arm, securing means between the handle-bar and arm, a beam connected to said laterally-adjustable section to swing both vertically and horizontally, a loose connection between said beam and standard to cause both to swing horizontally together, but admitting of independent vertical movement of the beam, and a connection between said beam and handle-bar.

In testimony whereof I affix my signature in presence of two witnesses.

BARNEY R. BROWN. [L. S.]

Witnesses:
JOE. SETSLER,
J. S. MORRIS.